United States Patent
Komatsubara et al.

(10) Patent No.: US 10,030,696 B2
(45) Date of Patent: Jul. 24, 2018

(54) FLUID DYNAMIC BEARING DEVICE, AND BEARING MEMBER AND SHAFT MEMBER FOR USE IN SAME

(71) Applicant: NTN CORPORATION, Osaka (JP)

(72) Inventors: Shinji Komatsubara, Mie (JP); Tetsuya Kurimura, Mie (JP); Yasuhiro Yamamoto, Mie (JP)

(73) Assignee: NTN CORPORATION, Osaka (JP)

( * ) Notice: Subject to any disclaimer, the term of this patent is extended or adjusted under 35 U.S.C. 154(b) by 2 days.

(21) Appl. No.: 15/506,349

(22) PCT Filed: Aug. 25, 2015

(86) PCT No.: PCT/JP2015/073855
§ 371 (c)(1),
(2) Date: Feb. 24, 2017

(87) PCT Pub. No.: WO2016/035613
PCT Pub. Date: Mar. 10, 2016

(65) Prior Publication Data
US 2017/0254357 A1   Sep. 7, 2017

(30) Foreign Application Priority Data

Sep. 1, 2014   (JP) ................................. 2014-177380

(51) Int. Cl.
*F16C 17/02* (2006.01)
*F16C 33/10* (2006.01)
(Continued)

(52) U.S. Cl.
CPC ............ *F16C 17/02* (2013.01); *F16C 33/106* (2013.01); *F16C 33/12* (2013.01); *H02K 5/165* (2013.01);
(Continued)

(58) Field of Classification Search
CPC ........ F16C 17/02; F16C 33/106; F16C 33/12; F16C 2380/26; H02K 5/165; H02K 7/086
See application file for complete search history.

(56) References Cited

U.S. PATENT DOCUMENTS

2011/0057527 A1   3/2011   Mori et al.
2011/0064341 A1*  3/2011   Mizuno ..................... B23B 5/00
                                                                  384/114
(Continued)

FOREIGN PATENT DOCUMENTS

| JP | 11-336761 | 12/1999 |
| JP | 3954695 | 8/2007 |
| JP | 2007-255457 | 10/2007 |

OTHER PUBLICATIONS

International Preliminary Report on Patentability and Written Opinion of the International Searching Authority dated Mar. 7, 2017 in International (PCT) Application No. PCT/JP2015/073855.
(Continued)

*Primary Examiner* — Thomas R Hannon
(74) *Attorney, Agent, or Firm* — Wenderoth, Lind & Ponack, L.L.P.

(57) ABSTRACT

A ratio W1/W2 of a circumferential width W1 of each of inclined hill portions G2 of a radial dynamic pressure generating portion G and a circumferential width W2 of each of inclined groove portions G3 is 1.2 or larger. And when an inner diameter of a bearing member is D, the circumferential width W2 of each of the inclined groove portions satisfies $0.2D \leq W2 \leq 0.4D$.

10 Claims, 3 Drawing Sheets

(51) Int. Cl.
*F16C 33/12* (2006.01)
*H02K 5/16* (2006.01)
*H02K 7/08* (2006.01)

(52) U.S. Cl.
CPC .......... *H02K 7/086* (2013.01); *F16C 2380/26* (2013.01)

(56) References Cited

U.S. PATENT DOCUMENTS

2013/0181558 A1* 7/2013 Kodama .............. H02K 5/1675
                                                                   310/90
2013/0293048 A1* 11/2013 Oh ........................ F16C 32/06
                                                                   310/90

OTHER PUBLICATIONS

International Search Report dated Nov. 24, 2015 in International (PCT) Application No. PCT/JP2015/073855.

* cited by examiner

FLUID DYNAMIC BEARING DEVICE, AND BEARING MEMBER AND SHAFT MEMBER FOR USE IN SAME

TECHNICAL FIELD

The present invention relates to a fluid dynamic bearing device, and a bearing member and a shaft member to be used therefor.

BACKGROUND ART

A fluid dynamic bearing device is configured to relatively rotatably support a shaft member in a non-contact manner by a pressure generated by a fluid film (for example, an oil film) in a radial bearing gap defined between an outer peripheral surface of the shaft member and an inner peripheral surface of a bearing member. The fluid dynamic bearing device has advantages in high rotational accuracy and quietness. Thus, the fluid dynamic bearing device is preferably used for a spindle motor for information equipment (for example, magnetic disk drives such as an HDD, drives for optical discs such as a CD-ROM, a CD-R/RW, a DVD-ROM/RAM, and a Blu-ray Disc, and drives for magneto-optical disks such as an MD and an MO), a polygon scanner motor for a laser beam printer (LBP), a color wheel for a projector, and a small-sized motor such as a fan motor to be used for a cooling fan or the like of an electrical apparatus.

The fluid dynamic bearing device is roughly classified into a type including a radial dynamic pressure generating portion formed on the inner peripheral surface of the bearing member or the outer peripheral surface of the shaft member and configured to actively generate a dynamic pressure in the fluid film in the radial bearing gap (so-called "dynamic bearing"), and a type including the inner peripheral surface of the bearing member and the outer peripheral surface of the shaft member both formed as cylindrical surfaces and being configured to generate a dynamic pressure through whirling of the shaft member (so-called "circular cylindrical bearing"). For example, in Patent Literature 1, there is described an example of the dynamic bearing.

CITATION LIST

Patent Literature 1: JP 3954695 B2

SUMMARY OF INVENTION

Technical Problem

Portable information devices (so-called "mobile devices") including, for example, a notebook personal computer and a tablet terminal are progressively reduced in thickness. Therefore, a fan motor to be built therein is also required to be reduced in thickness (reduced in axial dimension). Meanwhile, a cooling characteristic of the fan motor is required to be maintained. Hence, an impeller to be mounted to a rotary shaft tends to be large. Therefore, a load applied to the fluid dynamic bearing device configured to support the rotary shaft of the fan motor is increased. In particular, the mobile devices described above are used in various environments and postures. Therefore, the load applied to the fluid dynamic bearing device is further increased due to vibration generated during traveling, resulting in a fear of lowered rotation accuracy of the rotary shaft.

In view of the situations described above, the fluid dynamic bearing device is required to further improve a load capacity (in particular, a load capacity in a radial direction). For example, when the radial bearing gap is further reduced, the load capacity of the fluid dynamic bearing device in the radial direction can be increased. However, a size of the radial bearing gap depends on processing accuracy of the shaft member and the bearing member, in particular, processing accuracy of the radial dynamic pressure generating portion. Therefore, when the radial bearing gap is desired to be further reduced, extremely highly accurate processing is required, leading to an increase in processing cost.

Further, when a viscosity of a fluid (for example, oil) to fill the radial bearing gap is increased, the load capacity of the fluid dynamic bearing device can be increased. In this case, however, a rotational torque of the shaft member is disadvantageously increased.

In view of the above-mentioned situations, an object to be achieved by the present invention is to increase a load capacity of a fluid dynamic bearing device in a radial direction so as to improve rotation accuracy without bringing about a rise in processing cost and an increase in rotational torque.

Solution to Problem

When a fluid dynamic bearing device is operated in a steady posture, a dynamic bearing that provides a pressure improvement effect generated by a radial dynamic pressure generating portion has higher rotation accuracy of a shaft than a circular cylindrical bearing without the radial dynamic pressure generating portion. Meanwhile, in a case where the fluid dynamic bearing device is operated in an unsteady state (for example, a swinging state), when the shaft is greatly decentered from a bearing member, a load capacity often becomes larger in a circular cylindrical bearing than in the dynamic bearing. The reason thereof is considered as follows. Specifically, under a state in which the shaft is decentered, a radial bearing gap becomes extremely small. As a result, a fluid pressure in the radial bearing gap becomes extremely higher. In the dynamic bearing, the radial dynamic pressure generating portion having concave and convex portions on a bearing surface is formed. Therefore, in a region where a concave portion (groove portion) is formed, the extremely small radial bearing gap described above is not formed. In this manner, the dynamic bearing has a smaller supporting area than that of the circular cylindrical bearing by the amount corresponding to the formation of the concave portion, and therefore the load capacity becomes smaller than that of the circular cylindrical bearing when the shaft is decentered.

The present invention has been made in view of the above-mentioned point. More specifically, a fluid dynamic bearing device of the present invention comprises a bearing member, a shaft member inserted into an inner periphery of the bearing member, and a radial dynamic pressure generating portion formed on an inner peripheral surface of the bearing member or an outer peripheral surface of the shaft member. The radial dynamic pressure generating portion comprises an annular hill portion extending in a circumferential direction, a plurality of inclined hill portions extending from the annular hill portion to both sides in an axial direction, and a plurality of inclined groove portions formed between the plurality of inclined hill portions in the circumferential direction. A ratio $W_1/W_2$ of a circumferential width $W_1$ of each of the inclined hill portions and a circumferential width $W_2$ of each of the inclined groove portions is set to 1.2 or larger. When an inner diameter of the bearing member is D, the circumferential width W2 of each of the inclined groove portions satisfies $0.2D \leq W2 \leq 0.4D$.

As described above, when a ratio of an area of the hill portions is increased, more specifically, when the ratio W1/W2 of the circumferential width W1 of each of the inclined hill portions and the circumferential width W2 of each of the inclined groove portions is set to 1.2 or larger, an effect close to that obtained by the circular cylindrical bearing is demonstrated when the shaft is decentered, thereby increasing the load capacity. At this time, when the circumferential width W2 of each of the inclined groove portions is set within a predetermined range, that is, $0.2D \leq W2 \leq 0.4D$, an appropriate dynamic pressure effect is obtained by the radial dynamic pressure generating portion. In combination with the effect of increasing the ratio of the hill portions as described above, the higher load capacity than that obtained with the circular cylindrical bearing can be obtained when the shaft is decentered.

As described above, in order to demonstrate the effects as the dynamic bearing while demonstrating the effect close to that obtained by the circular cylindrical bearing, it is preferred that an angle of the inclined hill portion and the inclined groove portion relative to a circumferential direction be set within a range of from 10° to 30°.

When the bearing member is made of a sintered metal, a lubricating fluid in the extremely small radial bearing gap formed during swinging passes internally from an opening formed on a surface of the bearing member. Therefore, a pressure of a fluid film in the radial bearing gap is lowered. In this case, it is effective to increase the ratio of the area of the hill portions to increase a region where the extremely small radial bearing gap is formed as described above.

The fluid dynamic bearing device as described above can be appropriately incorporated into, for example, a fan motor.

Advantageous Effects of Invention

As described above, according to one embodiment of the present invention, the load capacity of the fluid dynamic bearing device in the radial direction is increased to enable enhancement of the rotation accuracy without bringing about the rise in processing cost rise or the increase in rotational torque.

DESCRIPTION OF EMBODIMENTS

Figure 1:
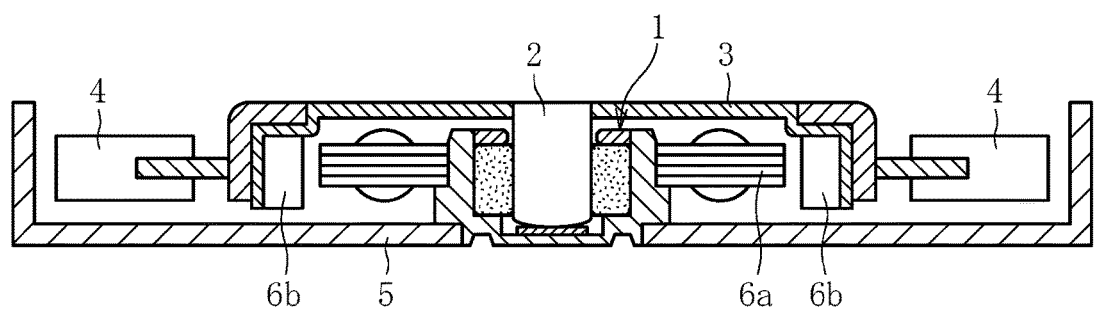
FIG. 1 is a sectional view of a fan motor.

In FIG. 1, a fan motor for cooling to be incorporated into an information device, in particular, a mobile device such as a cellular phone or a tablet terminal is illustrated. The fan motor comprises a fluid dynamic bearing device 1 according to one embodiment of the present invention, a rotor 3 mounted on a shaft member 2 of the fluid dynamic bearing device 1, a blade 4 mounted on a radially outer end of the rotor 3, a stator coil 6a and a rotor magnet 6b opposed to each other through intermediation of a gap in a radial direction, and a casing 5 configured to accommodate the above-mentioned components. The stator coil 6a is mounted on an outer periphery of the fluid dynamic bearing device 1, and the rotor magnet 6b is mounted on an inner periphery of the rotor 3. When an electric current is supplied to the stator coil 6a, the rotor 3, the blade 4, and the shaft member 2 rotate integrally, to thereby generate an air stream in an axial direction or a radially outer direction.

Figure 2:
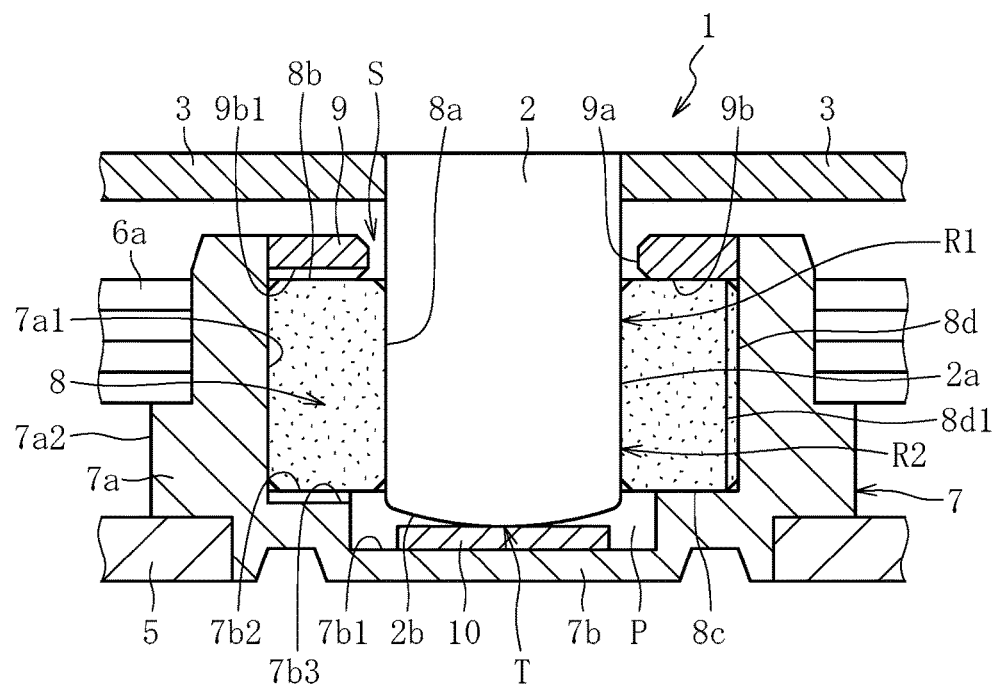
FIG. 2 is a sectional view of a fluid dynamic bearing device to be incorporated into the fan motor.

As illustrated in FIG. 2, the fluid dynamic bearing device 1 comprises the shaft member 2, a housing 7, a bearing sleeve 8 serving as a bearing member, a sealing member 9, and a thrust receiver 10. Hereinafter, an opening side of the housing 7 in an axial direction (vertical direction in FIG. 2) is referred to as "upper side", whereas a bottom 7b side of the housing 7 is referred to as "lower side" for convenience of the description.

The shaft member 2 is formed of a metal material such as stainless steel into a columnar shape. The shaft member 2 comprises a cylindrical outer peripheral surface 2a and a spherical protruding portion 2b formed at a lower end thereof.

The housing 7 comprises a substantially cylindrical side portion 7a and a bottom portion 7b that closes an opening of the side portion 7a on the lower side. In the illustrated example, the side portion 7a and the bottom portion 7b are integrally formed of a resin through injection molding. The casing 5 and the stator coil 6a are fixed onto an outer peripheral surface 7a2 of the side portion 7a. The bearing sleeve 8 is fixed onto an inner peripheral surface 7a1 of the side portion 7a. A shoulder surface 7b2 is formed at a radially outer end of an upper end surface 7b1 of the bottom portion 7b. The shoulder surface 7b2 is positioned upper side than an inner diameter portion of the upper end surface 7b1. A lower end surface 8c of the bearing sleeve 8 is held in abutment against the shoulder surface 7b2. Radial grooves 7b3 are formed on the shoulder surface 7b2. The thrust receiver 10 made of a resin is arranged on a central portion of the upper end surface 7b1 of the bottom portion 7b. In place of or in addition to the radial grooves 7b3 formed on the shoulder surface 7b2 of the housing 7, a radial groove may be formed on the lower end surface 8c of the bearing sleeve 8.

The bearing sleeve 8 forms a cylindrical shape, and is fixed onto the inner peripheral surface 7a1 of the side portion 7a of the housing 7 by an appropriate method such as gap bonding, press-fitting, or press-fit bonding (press-fitting in the presence of an adhesive). In this embodiment, the bearing sleeve 8 has an inner diameter of ϕ3 mm or smaller, an outer diameter of ϕ6 mm or smaller, and an axial dimension of 6 mm or smaller. The bearing sleeve 8 is made of, for example, a metal, specifically, a sintered metal, in particular, a copper iron-based sintered metal containing copper and iron as main components.

Figure 3:
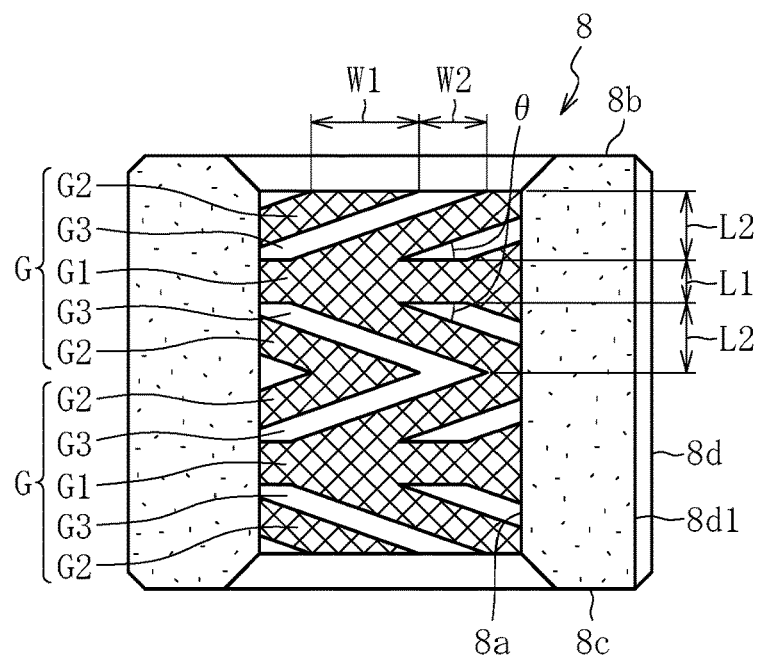
FIG. 3 is a sectional view of a bearing member of the fluid dynamic bearing device.

Radial dynamic pressure generating portions G are formed on the inner peripheral surface 8a of the bearing sleeve 8, which serves as a radial bearing surface. In this embodiment, dynamic pressure grooves having a herringbone pattern as illustrated in FIG. 3 are formed as the radial dynamic pressure generating portions G. Specifically, the radial dynamic pressure generating portion G comprises an annular hill portion G1 extending in a circumferential direction, a plurality of inclined hill portions G2 extending from the annular hill portion G1 to both sides in the axial direction, and a plurality of inclined groove portions G3 formed between the plurality of inclined hill portions G2 in the circumferential direction (the annular groove portions G1 and the inclined hill portions G2 are crosshatched in FIG.

3). In the illustrated example, the radial dynamic pressure generating portions G are respectively formed in two regions of the inner peripheral surface $8a$, which are adjacent in the axial direction. The upper and lower radial dynamic pressure generating portions G have the same shape. Radially inner surfaces of the annular hill portions G1 and radially inner surfaces of the inclined hill portions G2 are formed continuously on the same cylindrical surface. Each of the radial dynamic pressure generating portions G has an axially symmetric shape. One or both of the upper radial dynamic pressure generating portion and the lower radial dynamic pressure generating portion may have an axially asymmetric shape. In this case, a lubricating fluid in a radial bearing gap is pushed in the axial direction by the radial dynamic pressure generating portion having the axially asymmetric shape, thereby forcibly circulating the lubricating fluid inside the housing 7.

The lower inclined hill portion G2 of the upper radial dynamic pressure generating portion G and the upper inclined hill portion G2 of the lower radial dynamic pressure generating portion G are continuous. Similarly, the lower inclined groove portion G3 of the upper radial dynamic pressure generating portion G and the upper inclined groove portion G3 of the lower radial dynamic pressure generating portion G are continuous. Further, the upper inclined groove portion G3 of the upper radial dynamic pressure generating portion G reaches an upper end of the inner peripheral surface $8a$ of the bearing sleeve 8, whereas the lower inclined groove portion G3 of the lower radial dynamic pressure generating portion G reaches a lower end of the inner peripheral surface $8a$ of the bearing sleeve 8. The upper and lower radial dynamic pressure generating portions G may be formed so as to be separated from each other in the axial direction. In this case, a cylindrical surface, which has a diameter equal to that of the inclined groove portions G3 and is continuous with the inclined groove portions G3, is formed between the upper and lower radial dynamic pressure generating portions G in the axial direction.

A ratio W1/W2 of a circumferential width W1 of each of the inclined hill portions G2 and a circumferential width W2 of each of the inclined groove portions G3 is set to 1.2 or larger. When an inner diameter of the bearing sleeve 8 is D, the circumferential width W2 of each of the inclined groove portions G3 is set to satisfy $0.2D \leq W2 \leq 0.4D$. For example, when the inner diameter of the bearing sleeve 8 is 1.5 mm, the circumferential width W2 of each of the inclined groove portions 3 is set to 0.3 mm or larger and 0.6 mm or smaller. In order to achieve this, the number of the inclined groove portions G3 arranged on the same circumference is required to be set from four to eight. In this embodiment, the hill-groove ratio W1/W2 is 1.4, and the number of the inclined groove portions G3 is five. As a result, the circumferential width W2 of each of the inclined groove portions G3 is about 0.39 mm. In the illustrated example, the circumferential width W2 of each of the inclined groove portions G3 is constant in the axial direction over the entire region.

An inclination angle $\theta$ of the inclined hill portion G2 and the inclined groove portion G3 relative to the annular hill portion G1 is set to fall within a range of from 10° to 30°, and is set to, for example, 20°. A ratio L2/L1 of an axial dimension L2 of each of the inclined hill portion G2 and the inclined groove portion G3 on one axial side of the annular hill portion G1 to an axial dimension L1 of the annular hill portion G1 is set to about 1.2 to 2.5. In this embodiment, the ratio L2/L1 is set to 1.6.

Axial grooves $8d1$ are formed on an outer peripheral surface of the bearing sleeve 8. The number of the axial grooves $8d1$ is arbitrary. For example, the axial grooves $8d1$ are equiangularly formed at three locations.

The sealing member 9 is formed of a resin or a metal into an annular shape, and is fixed onto an upper end portion of the inner peripheral surface $7a1$ of the side portion $7a$ of the housing 7. The sealing member 9 is held in abutment against an upper end surface $8b$ of the bearing sleeve 8. An inner peripheral surface $9a$ of the sealing member 9 is opposed to the outer peripheral surface $2a$ of the shaft member 2 in the radial direction, and a sealing space S is formed therebetween. During rotation of the shaft member 2, the sealing space S prevents the lubricating oil inside the bearing from leaking out. Radial grooves $9b1$ are formed on a lower end surface $9b$ of the sealing member 9. In place of or in addition to the radial grooves $9b1$ formed on the lower end surface $9b$ of the sealing member 9, a radial groove may be formed on the upper end surface $8b$ of the bearing sleeve 8.

The fluid dynamic bearing device 1 is assembled through the following procedure. First, the thrust receiver 10 is fixed onto the upper end surface $7b1$ of the bottom portion $7b$ of the housing 7. Then, the bearing sleeve 8, in which inner pores are impregnated with a lubricating oil in advance, is inserted into an inner periphery of the side portion $7a$ of the housing 7, and the lower end surface $8c$ of the bearing sleeve 8 is brought into abutment against the shoulder surface $7b2$ of the bottom portion $7b$. In this state, the outer peripheral surface $8d$ of the bearing sleeve 8 is fixed onto the inner peripheral surface $7a1$ of the side portion $7a$. After that, the sealing member 9 is fixed onto an upper end of the inner peripheral surface $7a1$ of the side portion $7a$ of the housing 7. In this case, the bearing sleeve 8 can be retained in the axial direction by press-fitting the sealing member 9 into the side portion $7a$ of the housing 7 and holding the bearing sleeve 8 with the sealing member 9 and the shoulder surface $7b2$ of the bottom portion $7b$ of the housing 7 from both sides in the axial direction. Then, a lubricating oil is dropped onto an inner periphery of the bearing sleeve 8, and the shaft member 2 is inserted therein, to thereby complete the assembly of the fluid dynamic bearing device 1. In this case, the lubricating oil is filled into an inner space of the housing 7 (including inner pores of the bearing sleeve 8), which is sealed with the sealing member 9, and an oil surface is maintained within a range of the sealing space S.

In the fluid dynamic bearing device 1 having the above-mentioned configuration, when the shaft member 2 rotates, the radial bearing gap is formed between the inner peripheral surface $8a$ of the bearing sleeve 8 and the outer peripheral surface $2a$ of the shaft member 2. Then, a dynamic pressure generating action is generated in the lubricating oil in the radial bearing gap by the radial dynamic pressure generating portions G formed on the inner peripheral surface $8a$ of the bearing sleeve 8. More specifically, the lubricating oil in the radial bearing gap is gathered on the annular hill portion G1 side along the inclined groove portions G3 of each of the radial dynamic pressure generating portions G, thereby maximizing a pressure between the annular hill portions G1 and the outer peripheral surface of the shaft member 2. As a result, a first radial bearing portion R1 and a second radial bearing portion R2 configured to support the shaft member 2 in the radial direction are formed. The convex portion $2b$ at the lower end of the shaft member 2 and the thrust receiver 10 come into sliding contact with each other, thereby forming a thrust bearing portion T configured to support the shaft member 2 in a thrust direction. At this time, a space P on a closed side of the housing 7 and the sealing space S are brought into communication with each other through intermediation of the radial grooves 9b1 formed on the lower end surface 9b of the sealing member 9, the axial grooves 8d1 formed on the outer peripheral surface 8d of the bearing sleeve 8, and the radial grooves 7b3 formed on the shoulder surface 7b2 of the housing 7, and hence generation of a negative pressure in the space P is prevented.

When the fan motor comprising the fluid dynamic bearing device 1 is used in a steadyposture, the shaft member 2, and eventually, the rotor 3 and the vanes 4 rotate with high rotation accuracy owing to a pressure improvement effect of the radial dynamic pressure generating portions G. Therefore, noise caused by contact between the shaft member 2 and the bearing sleeve 8 or the like is less liable to be generated. Further, even when the fan motor is used in an unsteady state (for example, in a swinging state) to result in great decentering of the shaft member 2 relative to the bearing sleeve 8, a ratio of each of the inclined hill portions G2 of the radial dynamic pressure generating portions G is large (W1/W2≥1.2). As a result, a supporting force close to that obtained by a circular cylindrical bearing can be demonstrated. Further, the circumferential width W2 of each of the inclined grooves G3 of the radial dynamic pressure generating portions G is set to satisfy 0.2D≤W2≤0.4D. Thus, an appropriate dynamic pressure effect is obtained by the radial dynamic pressure generating portions G to the extent of not greatly impairing the above-mentioned effect close to that obtained by the circular cylindrical bearing. With the combination of the above-mentioned effects, the fluid dynamic bearing device 1 can demonstrate the supporting force larger than that obtained by the circular cylindrical bearing when the shaft member 2 is decentered. As a result, the contact between the shaft member 2 and the bearing sleeve 8 can be prevented as much as possible.

Figure 4:
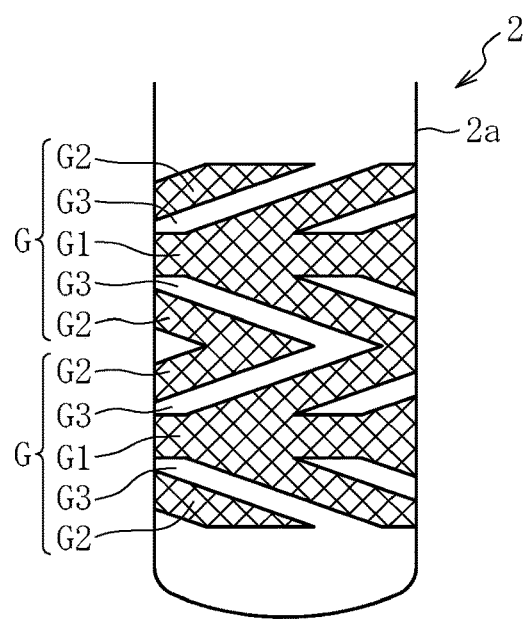
FIG. 4 is a side view of a shaft member of a fluid dynamic bearing device according to another embodiment of the present invention.

The present invention is not limited to the embodiment described above. For example, as illustrated in FIG. 4, the radial dynamic pressure generating portions G may be formed on the outer peripheral surface 2a of the shaft member 2, whereas the inner peripheral surface 8a of the bearing sleeve 8 may be formed as a cylindrical surface. In this case, similarly to the embodiment described above, the ratio W1/W2 of the circumferential width W1 of each of the inclined hill portions G2 and the circumferential width W2 of each of the inclined groove portions G3 of the radial dynamic pressure generating portions G is set to 1.2 or larger. Further, when an outer diameter of the shaft member 2 is D', the circumferential width W2 of each of the inclined groove portions G3 of the radial dynamic pressure generating portions G is set to fall within a range of 0.2D'≤W2≤0.4D'. The remaining configuration of the fluid dynamic bearing device 1 and details of the radial dynamic pressure generating portions G are similar to those of the embodiment described above, and therefore overlapping description thereof is herein omitted.

Further, although the thrust bearing portion T is configured to support the shaft member 2 in a contact manner in the embodiment described above, the thrust bearing portion is not limited thereto. The thrust bearing portion may support the shaft member in a non-contact manner by a pressure of the oil film as in the case of the radial bearing portions of the embodiment described above. For example, a flange portion can be provided to the lower end of the shaft member so that thrust bearing gaps are respectively formed between an upper end surface of the flange portion and the lower end surface of the bearing sleeve and between a lower end surface of the flange portion and an end surface of the housing. In this case, the thrust dynamic pressure generating portion may be formed on one of surfaces opposed to each other through intermediation of the thrust bearing gap therebetween.

Still further, although the so-called shaft rotation type fluid dynamic bearing device, which includes the bearing member to be fixed and the shaft member to be rotated, has been described in the embodiment described above, the fluid dynamic bearing device is not limited thereto. The present invention may also be applied to a so-called shaft-fixed type fluid dynamic bearing device, which includes the shaft member to be fixed and the bearing member to be rotated.

The fluid dynamic bearing device of the present invention can be used not only for the fan motor but also for a spindle motor for an information device (for example, an HDD), a polygon scanner motor for a laser beam printer, or a color wheel for a projector.

EXAMPLE

In order to verify the effects of the present invention, the following test was conducted. First, test pieces for Example and Comparison Examples 1 to 3, each having a shape substantially the same as that of the bearing sleeve 8 illustrated in FIG. 3 and different specifications of the radial dynamic pressure generating portion (see Table 1), were manufactured. Each of the test pieces is sized to have an inner diameter of 1.5 mm, an outer diameter of 3.0 mm, and an axial width of 2.5 mm.

TABLE 1

|  | Hill-Groove Ratio W1/W2 | Number Of Grooves | Circumferential Width W2 Of Groove (mm) | Angle Of Groove θ (deg) | Axial Width L2 Of Groove portion (mm) | Axial Width L1 Of Annular Groove Portion (mm) | Noise |
|---|---|---|---|---|---|---|---|
| Example | 1.4 | 5 | 0.39 | 20 | 0.4 | 0.25 | Absent |
| Comparison Example 1 | 1 | 5 | 0.47 | 20 | 0.4 | 0.25 | Present |
| Comparison Example 2 | 1.4 | 3 | 0.65 | 20 | 0.4 | 0.25 | Present |
| Comparison Example 3 | 1.4 | 9 | 0.22 | 20 | 0.4 | 0.25 | Present |

Figure 5:
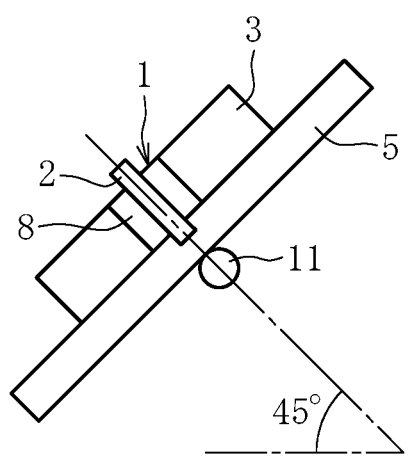
FIG. 5 is a side view of a swing test device.
Figure 5:
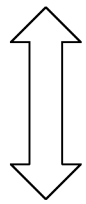
Figure 5:
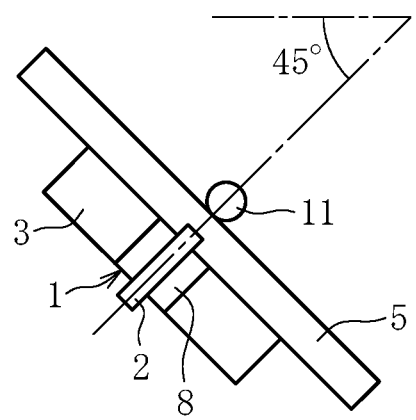

After each of the above-mentioned test pieces was incorporated into the fan motor illustrated in FIG. 1, a swing test was conducted so as to check the presence or absence of noise at this time. More specifically, as illustrated in FIG. 5, the fan motor was turned (swung) about a rotary shaft 11 between a state in which the shaft member 2 was positioned at 45° relative to a horizontal direction thereabove (upper part of FIG. 5) and a state in which the shaft member 2 was positioned at 45° relative to the horizontal direction therebelow (lower part of FIG. 5) while rotating at 2,000 r/min.

As a result, noise was generated in all of Comparison Examples 1 to 3, whereas no noise was generated in Example. From this result, it was clarified that, according to Example in which the hill-groove ratio W1/W2 of the radial dynamic pressure generating portion was 1.2 or larger and in which the circumferential width W2 of each of the inclined groove portions satisfied 0.2D≤W2≤0.4D, that is, the range of from 0.3 mm to 0.6 mm in the case of the test piece having the above-mentioned size, a load capacity given in the swung state of the fluid dynamic bearing device was large so that contact between the shaft and the bearing was less liable to occur.

REFERENCE SIGNS LIST 1 fluid dynamic bearing device
2 shaft member
7 housing
8 bearing sleeve
9 sealing member
G radial dynamic pressure generating portion
G1 annular hill portion
G2 inclined hill portion
G3 inclined groove portion
R1, R2 radial bearing portion
S sealing space
T thrust bearing portion

The invention claimed is:

1. A fluid dynamic bearing device, comprising:
a bearing member;
a shaft member inserted into an inner periphery of the bearing member; and
a radial dynamic pressure generating portion formed on an inner peripheral surface of the bearing member or an outer peripheral surface of the shaft member, the radial dynamic pressure generating portion comprising:
an annular hill portion extending in a circumferential direction,
a plurality of inclined hill portions extending from the annular hill portion to both sides in an axial direction, and
a plurality of inclined groove portions provided between the plurality of inclined hill portions in the circumferential direction,
wherein a ratio W1/W2 of a circumferential width W1 of each of the inclined hill portions and a circumferential width W2 of each of the inclined groove portions is 1.2 or larger, and when an inner diameter of the bearing member is D, the circumferential width W2 of the each of the inclined groove portions satisfies 0.2D≤W2≤0.4D.

2. A fan motor, comprising the fluid dynamic bearing device of claim 1.

3. The fluid dynamic bearing device according to claim 1, wherein the bearing member is made of a sintered metal.

4. A fan motor, comprising the fluid dynamic bearing device of claim 3.

5. The fluid dynamic bearing device according to claim 1, wherein an angle of each of the inclined hill portions and the inclined groove portions relative to the circumferential direction falls within a range from 10° to 30°.

6. A fan motor, comprising the fluid dynamic bearing device of claim 5.

7. The fluid dynamic bearing device according to claim 5, wherein the bearing member is made of a sintered metal.

8. A fan motor, comprising the fluid dynamic bearing device of claim 7.

9. A bearing member, which is to be incorporated into a fluid dynamic bearing device, and comprises a radial dynamic pressure generating portion formed on an inner peripheral surface of the bearing member, the radial dynamic pressure generating portion comprising:
an annular hill portion extending in a circumferential direction of the bearing member;
a plurality of inclined hill portions extending from the annular hill portion to both sides in an axial direction of the bearing member; and
a plurality of inclined groove portions formed between the plurality of inclined hill portions in the circumferential direction,
wherein a ratio W1/W2 of a circumferential width W1 of each of the inclined hill portions of the radial dynamic pressure generating portion and a circumferential width W2 of each of the inclined groove portions is 1.2 or larger, and when an inner diameter of the bearing member is D, the circumferential width W2 of the each of the inclined groove portions satisfies 0.2D≤W2≤0.4D.

10. A shaft member, which is to be incorporated into a fluid dynamic bearing device and comprises a radial dynamic pressure generating portion formed on an outer peripheral surface of the shaft member, the radial dynamic pressure generating portion comprising:
an annular hill portion extending in a circumferential direction of the shaft member;
a plurality of inclined hill portions extending from the annular hill portion to both sides in an axial direction of the shaft member; and
a plurality of inclined groove portions formed between the plurality of inclined hill portions in the circumferential direction,
wherein a ratio W1/W2 of a circumferential width W1 of each of the inclined hill portions of the radial dynamic pressure generating portion and a circumferential width W2 of each of the inclined groove portions is 1.2 or larger, and when an outer diameter of the shaft member is D', the circumferential width W2 of the each of the inclined groove portions satisfies 0.2D'≤W2≤0.4D'.

* * * * *